(12) United States Patent
Kyono

(10) Patent No.: US 7,212,416 B2
(45) Date of Patent: May 1, 2007

(54) SWITCHING POWER SUPPLY DEVICE AND SWITCHING METHOD

(75) Inventor: Yoichi Kyono, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 11/285,694

(22) Filed: Nov. 21, 2005

(65) Prior Publication Data

US 2006/0109693 A1 May 25, 2006

(30) Foreign Application Priority Data

Nov. 19, 2004 (JP) .............................. 2004-336008

(51) Int. Cl.
*H02M 3/335* (2006.01)
*H02M 7/217* (2006.01)

(52) U.S. Cl. .................................. 363/21.14; 363/127

(58) Field of Classification Search ............ 363/21.01, 363/21.06, 21.12, 21.14, 89, 97, 127, 131
See application file for complete search history.

(56) References Cited

U.S. PATENT DOCUMENTS 4,945,465 A * 7/1990 Marinus et al. ............... 363/89

6,061,255 A * 5/2000 Chik et al. ............... 363/21.06
6,353,544 B1 * 3/2002 Lau ........................ 363/21.14
6,791,849 B2 * 9/2004 Nakayama ............... 363/21.14

FOREIGN PATENT DOCUMENTS

JP 2004-135415 4/2004

* cited by examiner

*Primary Examiner*—Gary L. Laxton
(74) *Attorney, Agent, or Firm*—Howard & Howard Attorneys, P.C.

(57) ABSTRACT

A current flowing through a reactor flows through a resistor, which generates a voltage in accordance with the value of the current. As the voltage generated by the resistor is greater than or equal to the threshold of a transistor, the transistor is in an on state. As the current flowing through the reactor decreases and the voltage generated by the resistor becomes lower than the threshold of the transistor, the transistor turns off and an NMOS turns on. Accordingly, the gate voltage of an NMOS is decreased by a diode, ensuring that the NMOS is turned off before the current flowing through the secondary winding of a transformer becomes zero.

24 Claims, 13 Drawing Sheets

SWITCHING POWER SUPPLY DEVICE AND SWITCHING METHOD

BACKGROUND OF THE INVENTION

1. Field of the Invention

The present invention relates to a switching power supply device and a switching method used by the same.

2. Description of the Related Art

A conventional switching power supply (switched-mode power supply) device is disclosed in Unexamined Japanese Patent Application KOKAI Publication No. 2004-135415.

FIG. 13 shows a circuit diagram illustrating a conventional switching power supply device given in the Publication.

The switching power supply device comprises a main switching element Q1, a synchronous rectification switching element Q2, a series circuit 26, and a synchronous rectification switching control circuit 27.

The main switching element Q1 switches (turns on and off) a current which flows through the primary winding LP, of a transformer T1. The synchronous rectification switching element Q2 is connected between the secondary winding, LS, of the transformer T and a load. The series circuit 26 includes a synchronous-rectification-inductance element L1 and a diode D1, and is connected to the secondary winding LS of the transformer T1 in parallel. The synchronous rectification switching control circuit 27 includes a diode D2, a capacitor C51, and a transistor Q5.

The synchronous rectification switching element Q2 turns off in an on period of the main switching element Q1, and stores or accumulates electrical power in the transformer T1 and the synchronous-rectification-inductance element L1. In tern, the synchronous rectification switching element Q2 turns on in an off period of the main switching element Q1, and permits the stored electrical power to be released. Before the release of the electrical power stored in the transformer T1 is completed, the action of the diode D1 causes the synchronous-rectification-inductance element L1 to complete the release of the stored electrical power. In accordance with a voltage at a node A between the synchronous-rectification-inductance element L1 and the diode D1, the diode D2 in a synchronous rectification switching control circuit 27 detects that the stored electrical power of the synchronous-rectification-inductance element L1 has been released, and turns off the synchronous rectification switching element Q2.

In the switching power supply device, even if the release of the stored electric power of the transformer T1 is completed, the voltage at the node A may not drop instantaneously. To be more precise, the voltage at the node A may not drop instantaneously after the release of the stored electric power from the transformer T1 is completed because of the effect of the inductance of the synchronous-rectification-inductance element L1 and the capacity of the synchronous-rectification control circuit 27, or the parasitic capacity of the synchronous rectification inductance element L1. The delay of the reduction in voltage at the node A may keep the synchronous rectification switching element Q2 turned on after the release of the stored electrical power of the transformer T1 is completed. This may deteriorate the efficiency, and damage the element.

SUMMARY OF THE INVENTION

Accordingly, the objects of the present invention to realize a switching power supply device in which the rectifying switch turns on and off at adequate timings.

To achieve the object, a switching power supply device of the invention comprises:

a transformer with a primary and a secondary winding;

a main switching element which switches a current flowing through the primary winding;

a controller which controls an operation of the main switching element;

a smoothing circuit;

a rectifying switching element which connects and disconnects between the secondary winding and the smoothing circuit; and a rectifying-element drive circuit which drives the rectifying switching element, and includes a reactor which is connected to the secondary winding in parallel, stores energy during an on period of the main switching element, and releases the stored energy during an off period of the main switching element, and a drive circuit which detects a current value of a current flowing through said reactor and turns on the rectifying switching element in the off period of the main switching element when the current flowing through the reactor is greater than or equal to a predetermined value, and turns off the rectifying switching element when the current flowing through the reactor is less than the predetermined value.

By employing such a structure, the rectifying switching element turns on by the drive circuit when the current which flows through the reactor, connected to the secondary winding of the transformer in parallel, is greater than or equal to the predetermined value. The rectifying switching element turns off when the current which flows through the reactor becomes smaller than the predetermined value. This makes it possible to prevent making the on period in which the rectifying switching element is on longer needlessly.

The driving circuit may include a current detection circuit which detects the current value of the current flowing through the reactor. The current detection circuit may include a current detection resistor with one end connected to the reactor and an other end connected to the secondary winding, and a transistor with a control electrode, and a first and a second conduction electrode which change conduction states based on a signal supplied to the control electrode, the control electrode (base) being connected to the reactor, the first conduction electrode (emitter) being connected to the secondary winding, and the drive circuit may turn off the rectifying switching element, based on a voltage at said second conduction electrode of said transistor when a voltage drop at the current detection resistor due to the current flowing through the reactor becomes lower than a threshold of the transistor.

The transistor may be a bipolar transistor whose base, emitter, and collector respectively correspond to the control electrode, the first conduction electrode, and the second conduction electrode. The transistor may be a MOS transistor whose gate, source, and drain respectively correspond to the control electrode, the first conduction electrode, and the second conduction electrode.

The drive circuit may include an off-control switch which has a main terminal with one end (source) connected to the secondary winding, and an other end (drain) connected to a control terminal of the rectifying switching element, and a control terminal (gate) connected to an auxiliary winding, connected to the secondary winding in series, and the second conduction electrode (collector) of the transistor, turn on, reducing a voltage at the control terminal of said rectifying switching element, when the transistor is turned off.

The drive circuit may include a current bypass diode whose anode and cathode respectively connected to the reactor, and the second conduction electrode of the transistor.

The drive circuit may include a hysteresis circuit which includes a resistor and a diode, is connected between the reactor and the other end of the current path of the off-control switch, and permits the current flowing through the reactor to partly flow through the off-control switch during an on period of the off-control switch.

The drive circuit may include a bias circuit which ensures a current flow to the current detection circuit from the auxiliary winding or the control terminal of the rectifying switching element via a resistor.

The rectifying-element drive circuit may include a capacitor which is connected between the control terminal of the rectifying switching element and the auxiliary winding, and has a voltage-reduction function of reducing a voltage at the control terminal of the rectifying switching element, or has functions of a drive function of driving the rectifying switching element and the voltage-reduction function.

The drive circuit may include a drive transistor whose emitter, base, and collector are respectively connected to the control terminal of the rectifying switching element, an other end of a main terminal of the off-control switch, and the auxiliary winding, and a resistor and a Zener diode are connected between the base and the collector of said drive transistor.

The drive circuit may include a current detection circuit which detects a current value of the current flowing through the reactor and a gate circuit such as an NOR circuit which turns on and off the rectifying switching element based on an output signal of the detection result of said current detection circuit when said main switching element is off.

The current detection circuit may includes
a current detection resistor having one end connected to the reactor and an other end connected to the secondary winding, and
a comparator which compares a voltage generated by the current detection resistor with a predetermined voltage, and
the drive circuit may turn on and off the rectifying switching element based on an output signal of the comparator when said main switching element is off.

To achieve the object, a switching method according to the invention comprises the steps of:
intermittently supplying a current to a primary winding of a transformer; and
turning on a rectifying switching element to supply an output of a secondary winding of the transformer to a smoothing circuit via a rectifying switching element by in a period in which no current flows through the first winding and when a current value of a current flowing through a reactor, connected to the secondary winding of the transformer in parallel, is greater than or equal to a predetermined value, based on the current flowing through the reactor, and turning off the rectifying switching element when the current value of the current flowing through the reactor is less than the predetermined value.

According to the invention, when the current which flows through the reactor is less than the predetermined value, the rectifying switching element turns off. Therefore, making the time, during which the rectifying switching element is on, longer needlessly can be prevented, and the efficiency is improved.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS (First Embodiment)

Figure 1:
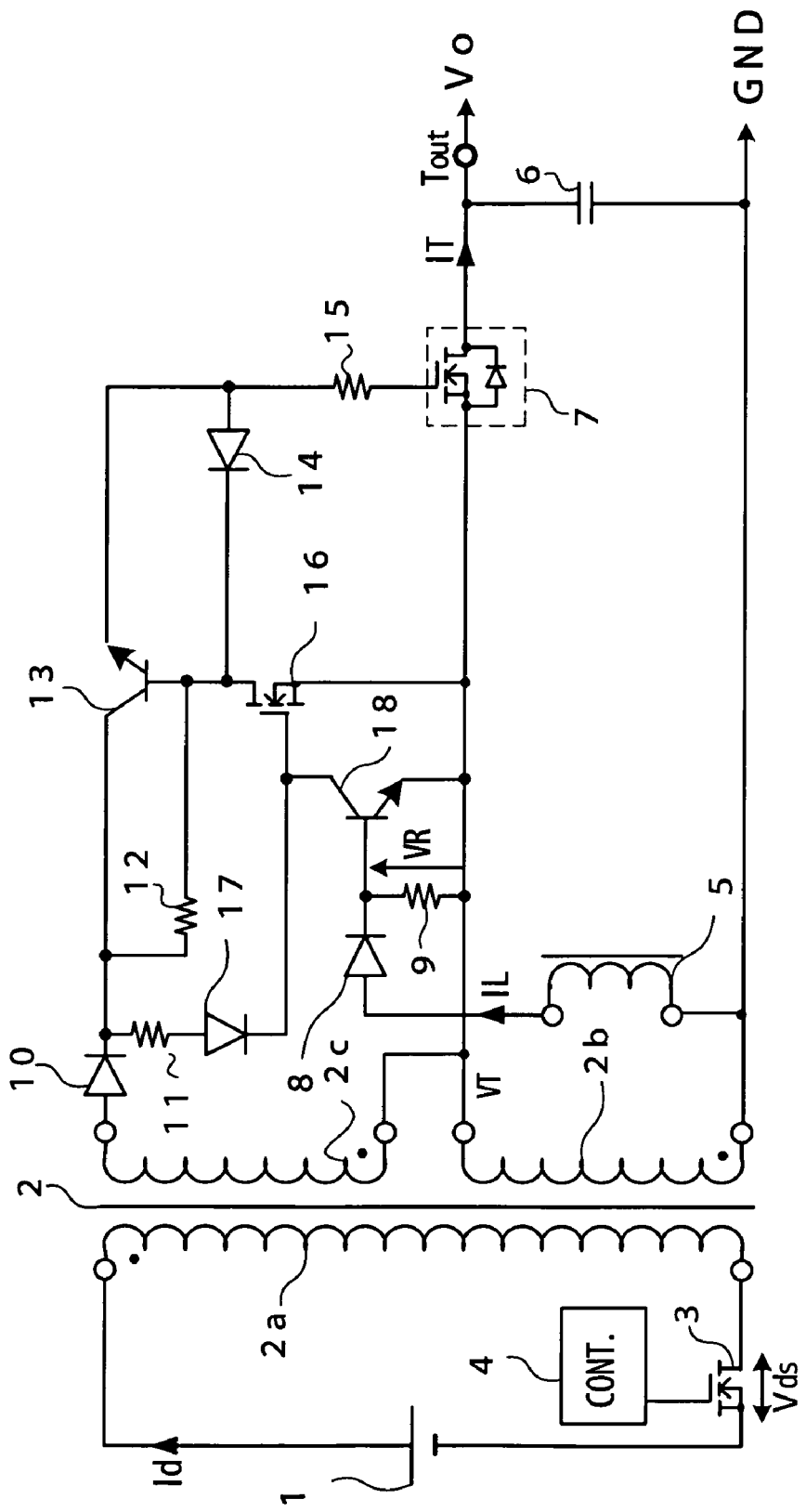
FIG. 1 is a circuit diagram illustrating a switching power supply device according to a first embodiment of the invention.

FIG. 1 is a circuit diagram illustrating a switching (switched-mode) power supply device according to a first embodiment of the present invention.

The switching power supply device is a flyback converter which includes a transformer 2 connected to a direct-current (DC) power source 1.

The hot side of a primary winding 2a of the transformer 2 is connected to the anode of the DC power source 1. The cold side of the primary winding 2a is connected to the drain of an N-channel type MOS (Metal Oxide Semiconductor) transistor (hereinafter, "NMOS") 3 which is a main switching element. A controller 4 is connected to the gate of the NMOS 3, and supplies a control signal to that gate. The source of the NMOS 3 is connected to the cathode of the DC power source 1.

The transformer 2 further includes a secondary winding 2b and an auxiliary winding 2c which are electromagnetically coupled to the primary winding 2a via a core. The auxiliary winding 2c is connected to the cold side of the secondary winding 2b in series.

The hot side of the secondary winding 2b is connected to one end of a reactor 5, the negative electrode of a smoothing capacitor 6, and the ground GND. The cold side of the secondary winding 2b is connected to the source of an NMOS 7 which serves as a synchronous-rectification switching element. The drain of the NMOS 7 is connected to the positive electrode of the smoothing capacitor 6. An output terminal Tout is connected to the positive electrode of the smoothing capacitor 6. An output voltage Vo is supplied to a non-illustrated load from the output terminal Tout.

The other end of the reactor 5 is connected to the anode of a backflow prevention diode 8. The cathode of the diode 8 is connected to one end of a current-detection resistor 9. The other end of the current-detection resistor 9 is connected to the cold side of the secondary winding 2b. Accordingly, a series circuit of the reactor 5, the diode 8, and the resistor 9 is connected to the secondary winding 2b in parallel.

The cold side of the auxiliary winding 2c connected to the secondary winding 2b is connected to the anode of a diode 10. The cathode of the diode 10 is connected to one ends of resistors 11 and 12, and the collector of an NPN transistor 13.

The other end of the resistor 12 is connected to the base of the transistor 13. The emitter of the transistor 13 is connected to the anode of a diode 14 and one end of a resistor 15. The cathode of the diode 14 is connected to the base of the transistor 13. The other end of the resistor 15 is connected to the gate of the NMOS 7.

The base of the transistor 13 is further connected to the drain of an NMOS 16. The source of the NMOS 16 is connected to the cold side of the secondary winding 2b.

The other end of the resistor 11 is connected to the anode of a diode 17. The cathode of the diode 17 is connected to the gate of the NMOS 16, and the collector of the NPN transistor 18. The base of the transistor 18 is connected to a node between the diode 8 and the resistor 9. The emitter of the transistor 18 is connected to the cold side of the secondary winding 2b. An NPN bipolar transistor may be used instead of the NMOS 16. In this case, the collector, base, and emitter of the NPN transistor substituting the NMOS 16 are respectively connected to the base of the NPN transistor 13, the cathode of the diode 17, and the cold side of the secondary winding 2b.

Next, an operation of the switching power supply device shown in FIG. 1 will be explained.

FIGS. 2A to 2H are waveform charts for explaining the operation of the switching power supply device.

The NMOS 3 turns on and off in response to a control signal supplied from the controller 4. In a period in which the NMOS 3 is in the on state, that is, when a drain-source voltage Vds of the NMOS 3 illustrated in FIG. 2A is (almost) zero volt, a primary current Id flows through (across) the primary winding 2a of the transformer 2 as illustrated in FIG. 2B.

Given that the length of the on period during which the NMOS 3 is on is Ton, the inductance of the primary winding 2a is Lp, and the output voltage of the DC power source 1 is Vin, the transformer 2 stores an energy of $(Vin^2/2Lp)Ton$ in the on period of the NMOS 3.

Figure 2:
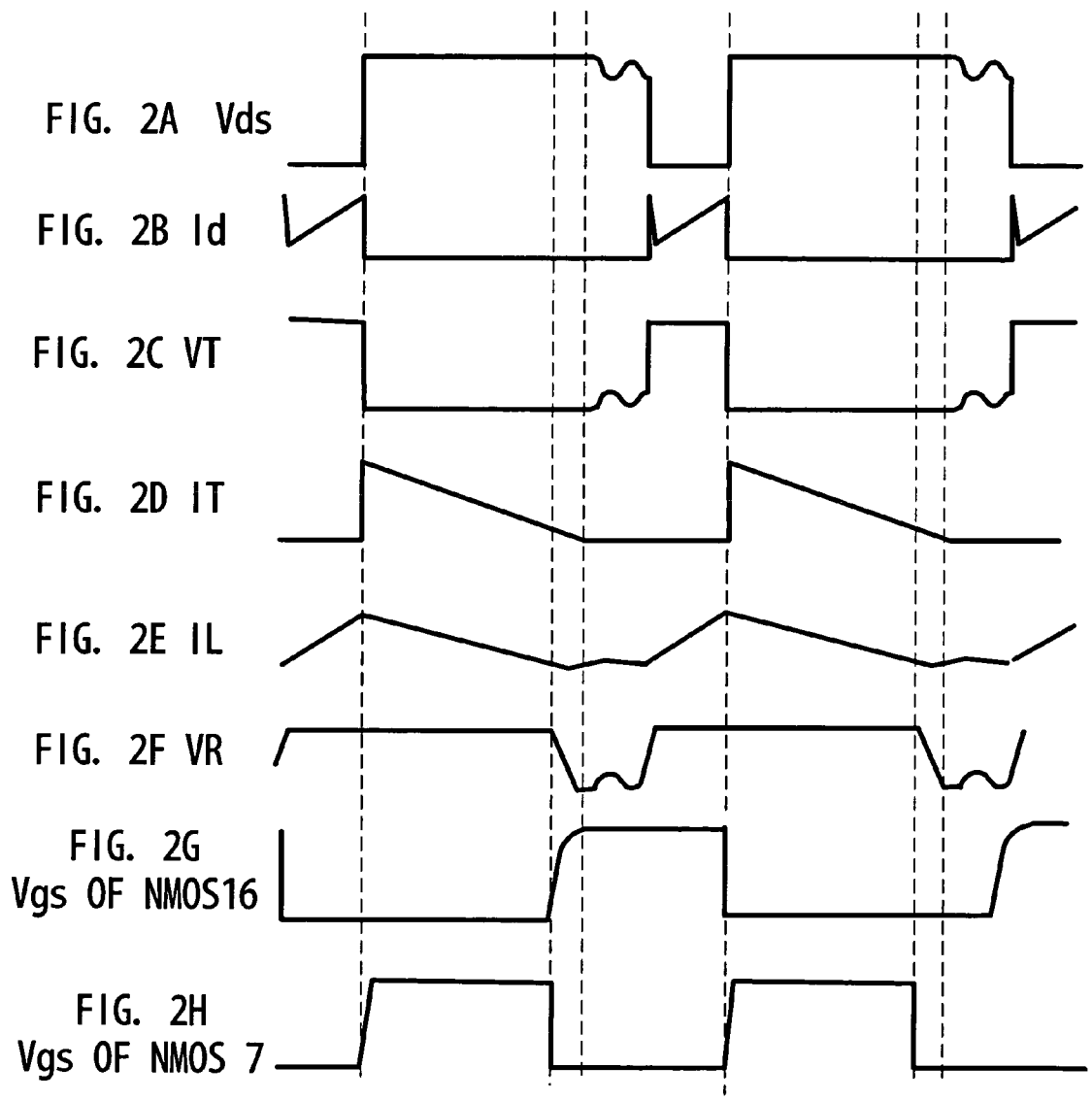
FIGS. 2A to 2H are waveform charts for explaining an operation of the switching power supply device.

As illustrated in FIG. 2C, the secondary winding 2b generates a voltage VT from its hot side in the on period of the NMOS 3, and the voltage on the hot side becomes higher than the voltage on the cold side. The auxiliary winding 2c generates a voltage from its hot side, and the voltage on the hot side becomes higher than the voltage on the cold side. As the voltage at the hot side of the auxiliary winding 2c becomes higher than that on the cold side of the auxiliary winding 2c, the transistor 13 is set in an off state. Accordingly, as illustrated in FIG. 2H, the gate-source voltage Vgs of the NMOS 7 is not generated, and the NMOS 7 is set in an off state.

Given that the number of turns on the primary winding 2a of the transformer 2 is np, and the number of turns on the secondary winding 2b is ns, a voltage VT generated at the secondary winding 2b in the on period of the NMOS 3 can be expressed by an equation:

$$VT=(ns/np)Vin.$$

As the voltage on the hot side of the secondary winding 2b becomes higher than that on the cold side, a current IL flows to the diode 8 and the resistor 9 from the reactor 5 as illustrated in FIG. 2E. The current IL increases in the on period of the NMOS 3.

When the voltage drop across the resistor 9 due to the flow of the current IL through the resistor 9 becomes larger than the threshold of the transistor 18, the transistor 18 comes to an on state. Accordingly, the voltage drop across the resistor 9 changes as illustrated in FIG. 2F. With the sum of the forward voltage of the diode 8 and the voltage drop VR across the resistor 9 or a base-emitter voltage VR of the transistor 18 being $\Delta V(t)$, a voltage of $VT-\Delta V(t)$ is applied to the reactor 5.

When the NMOS 3 turns off based on the control signal of the controller 4, the secondary winding 2b and auxiliary winding 2c of the transformer 2 generate voltages higher than the voltages on the hot sides from the cold sides. Because of the voltage at the secondary winding 2b of the transformer 2, the capacitor 6 is charged through a parasitic diode of the NMOS 7.

Immediately after the NMOS 3 has turned off, the transistor 18 is in an on state and the NMOS 16 is in an off state, so that the voltage on the cold side of the auxiliary winding 2c becomes higher than that on the hot side of the auxiliary winding 2c. This increases the base voltage of the transistor 13 through the resistor 12, turning on the transistor 13.

The on action of the transistor 13 causes the NMOS 7 to turn on. As the NMOS 7 turns on, the energy stored in the transformer 2 is released as a secondary current IT through the NMOS 7 as illustrated in FIG. 2D. The capacitor 6 is charged by the secondary current IT.

The secondary current IT decreases with the time. The inclination of the decrease in secondary current IT may be expressed as $(Vo^2/2LS)t^2$. Here, LS denotes the inductance of the secondary winding 2b.

The numbers of turns, np and ns of the primary and secondary windings 2a and 2b, the inductance LP of the primary winding 2a and the inductance LS of the secondary winding 2b have a relationship expressed by an equation:

$$LS=(ns^2/np^2)LP.$$

Accordingly, a time t until the secondary current IT stops flowing can be expressed by an equation:

$$t=(nsVin/npVo)Ton.$$

The reactor 5 releases the energy stored in the on period of the NMOS 3 via the diode 8 when the NMOS 3 turns off. Provided that the sum of the forward voltage of the diode 8 and the voltage drop at the resistor 9 or the base-emitter voltage of the transistor 18 is $\Delta V(t)on$, and the inductance of the reactor 5 is L and the on period of the NMOS3 is Ton, the current IL which flows through the reactor 5 at the end of the on period of the NMOS 3 can be expressed by an equation:

$$IL=(VT-\Delta V(t)on)Ton/L.$$

The current IL which flows through the reactor 5 decreases in an off period in which the NMOS 3 is off.

Provided that the sum of the forward voltage of the diode 8 and the voltage drop across the resistor 9 or the base-emitter voltage of the transistor 18 is $\Delta V(t)$off, a time during which the current IL flowing through the reactor 5 becomes zero will now be expressed by an equation:

$$t = (VT - \Delta V(t) \text{ on}) \text{ Ton}/(Vo + \Delta V(t) \text{ off}) \quad (1)$$
$$= ((ns/np)Vin - \Delta V(t) \text{ on}) \text{ Ton}/(Vo + \Delta V(t) \text{ off}).$$

$\Delta V(t)$on and $\Delta V(t)$off are sufficiently smaller values than a voltage $V_2$ generated by the secondary winding 2b and the voltage Vo. Accordingly, as illustrated in FIGS. 2D and 2E, the current IL which flows through the reactor 5 becomes zero slightly faster than the secondary current IT.

As the current IL flowing through the reactor 5 decreases and the voltage drop VR across the resistor 9 becomes lower than the threshold of the transistor 18, the transistor 18 turns off. Accordingly, the gate of the NMOS 16 is enabled (applied with a high voltage) via the resistor 11 and the diode 17, causing the NMOS 16 to turn on. The on action of the NMOS 16 sets the transistor 13 in an off state, so that electrical charges are drawn from the gate of the NMOS 7 via the diode 14. This causes the gate-source voltage Vgs of the NMOS 7 to drop, thus turning off the NMOS 7.

The current IL which flows through the reactor 5 and determines a timing at which the NMOS 7 turns off can be set by an equation:

$$IL=V_{BE}/R_9$$

where $V_{BE}$ is the base-emitter voltage of the transistor 18, and $R_9$ is the value of resistance of the resistor 9.

Increasing the value of resistance $R_9$ makes it possible to set the timing at which the NMOS 7 turns off immediately before the current IL through the reactor 5 becomes zero. Hence, because of the relationship expressed by the equation (1), the NMOS 7 turns off before the secondary current IT becomes zero. After the NMOS 7 turns off, the parasitic diode of the NMOS 7 performs rectification. Since the secondary current IT is basically a triangular wave, even if the current IL is rectified by the parasitic diode, the product of the current and the time during that period is just a few percentages of the total current, which does not affect the loss substantially.

The voltage across the reactor 5 which is connected to the secondary winding 2b as in the manner illustrated in FIG. 1 is (Vo+$\Delta$V) in a period during which the energy in the reactor 5 is released, and becomes zero after the release of the energy is finished. Detecting the voltage across the reactor 5 makes it possible to turn off the NMOS 7 immediately before the secondary current IT becomes zero. The voltage across the reactor 5, however, does not instantaneously drop because of the inductance of the reactor 5 and the capacity of a voltage detection circuit, or the parasitic capacity of the reactor 5. Because of this delay, there is a negative possibility that the NMOS 7 keeps turned on after the secondary current IT becomes zero.

Designing the power supply device in view of such a delay requires that the value of resistance of the resistor 9 which is connected to the reactor 5 in series be increased, and a plurality of diodes 8 be connected in series. Because the voltage drop is changed by the load and temperature, the synchronous rectification period should be so designed shorter. Reducing the inductance L of the reactor 5 makes the lowering speed of the voltage across the reactor 5 faster, but the current IL increases accordingly, thereby increasing the loss.

When the NMOS 7 is turned off based on a change in voltage across the reactor 5, therefore, the loss may be increased and the packaging space may be increased, making it difficult to achieve cost reduction. In contrast, the switching power supply device of the embodiment detects the value of the current IL which flows through the reactor 5 by means of the resistor 9, and turns off the NMOS 7 based on that current value. Accordingly, it is possible to surely turn off the NMOS 7 before the secondary current IT becomes zero without being affected by the delay caused by the inductance of the reactor 5. This makes it possible to realize an efficient switching power supply device at a low cost.

(Second Embodiment)

Figure 3:
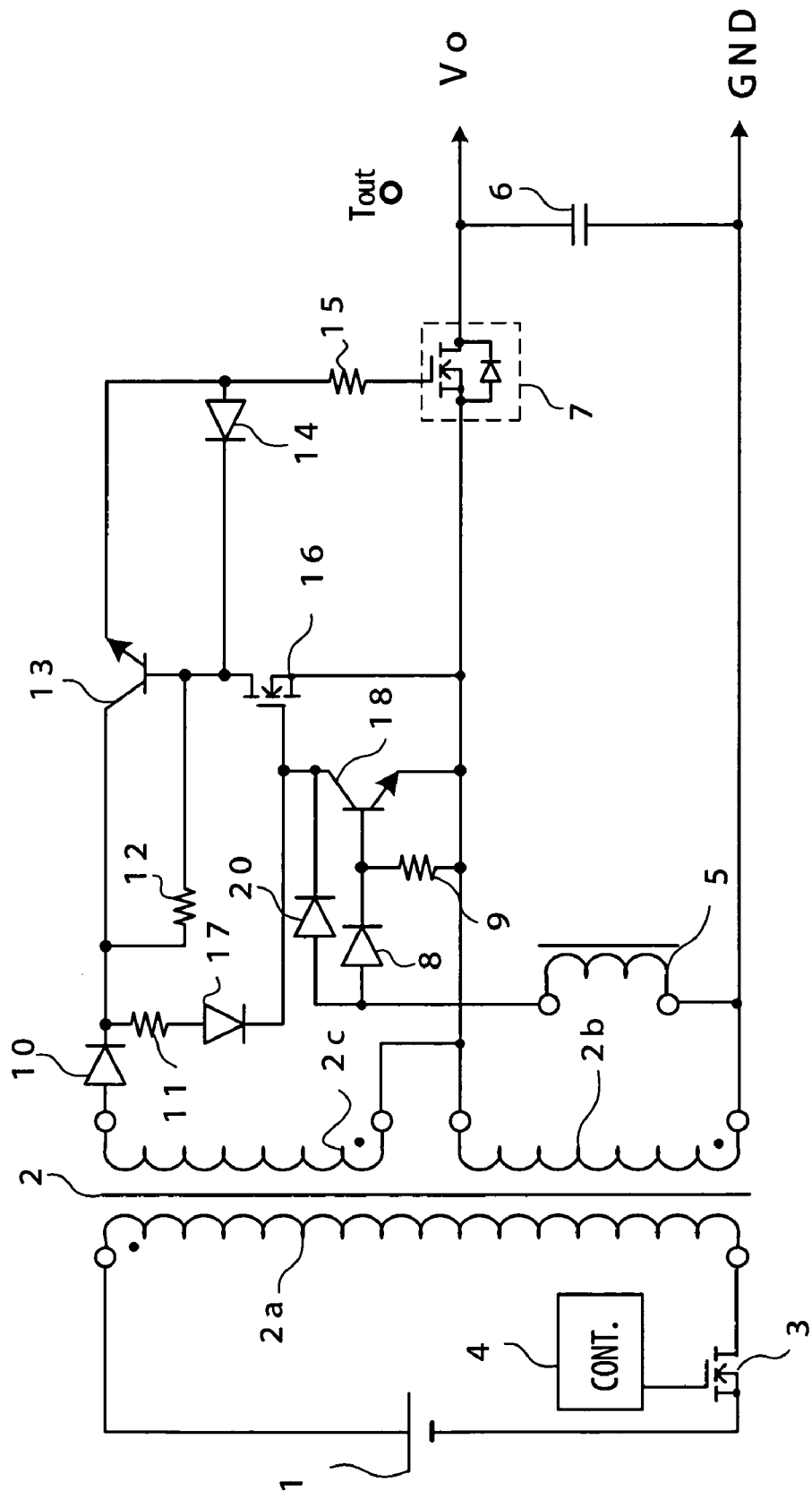
FIG. 3 is a circuit diagram illustrating a switching power supply device according to a second embodiment of the invention.

FIG. 3 is a circuit diagram illustrating a switching power supply device according to a second embodiment of the invention, and components common to those of the first embodiment in FIG. 1 will be denoted by the same reference numerals.

The switching power supply device includes a current-bypass diode 20 together with the structure shown in FIG. 1. The remaining structures are the same as those of the switching power supply device of the first embodiment.

The anode of the diode 20 is connected to the node between the one end of the reactor 5 and the anode of the diode 8. The cathode of the diode 20 is connected to the collector of the transistor 18.

A basic operation of the switching power supply device is the same as that of the first embodiment. The current IL which flows through the reactor 5 after the transistor 18 turns on, however, flows into the collector of the transistor 18 as well as the base thereof because the diode 20 is provided between the one end of the reactor 5 and the collector of the transistor 18.

In the switching power supply device of the first embodiment, the current IL which flows through the reactor 5 entirely becomes the base current of the transistor 18. In general, the absolute maximum rating of a base current of a transistor is smaller than its collector current, and a control transistor with a small signal cannot increase the current IL which flows through the reactor 5.

It is possible to limit the value of the current IL which flows through the reactor 5 within the standard by increasing the inductance L of the reactor 5. Too much limitation, however, may not obtain a sufficient current gain at the transistor 18. Accordingly, it is not preferable that all of the current IL of the reactor 5 should flow into the base of the transistor 18.

In the switching power supply device of the embodiment, the current IL which flows through the reactor 5 partly flows into the collector of the transistor 18. This makes it possible to prevent the base current of the transistor 18 from exceeding the absolute maximum rating. In this case, the transistor 18 performs class A operation in such a way that the collector-emitter voltage of the transistor 18 becomes equal to the base-emitter voltage thereof. Accordingly, in a case where the NMOS 16 has a low threshold, or a bipolar transistor is used instead of the NMOS 16, it is necessary to divide the collector voltage of the transistor 18 by using a voltage-dividing resistor or the like, and apply the divided voltage to the gate of the NMOS 16 or the base of the bipolar transistor.

(Third Embodiment)

Figure 4:
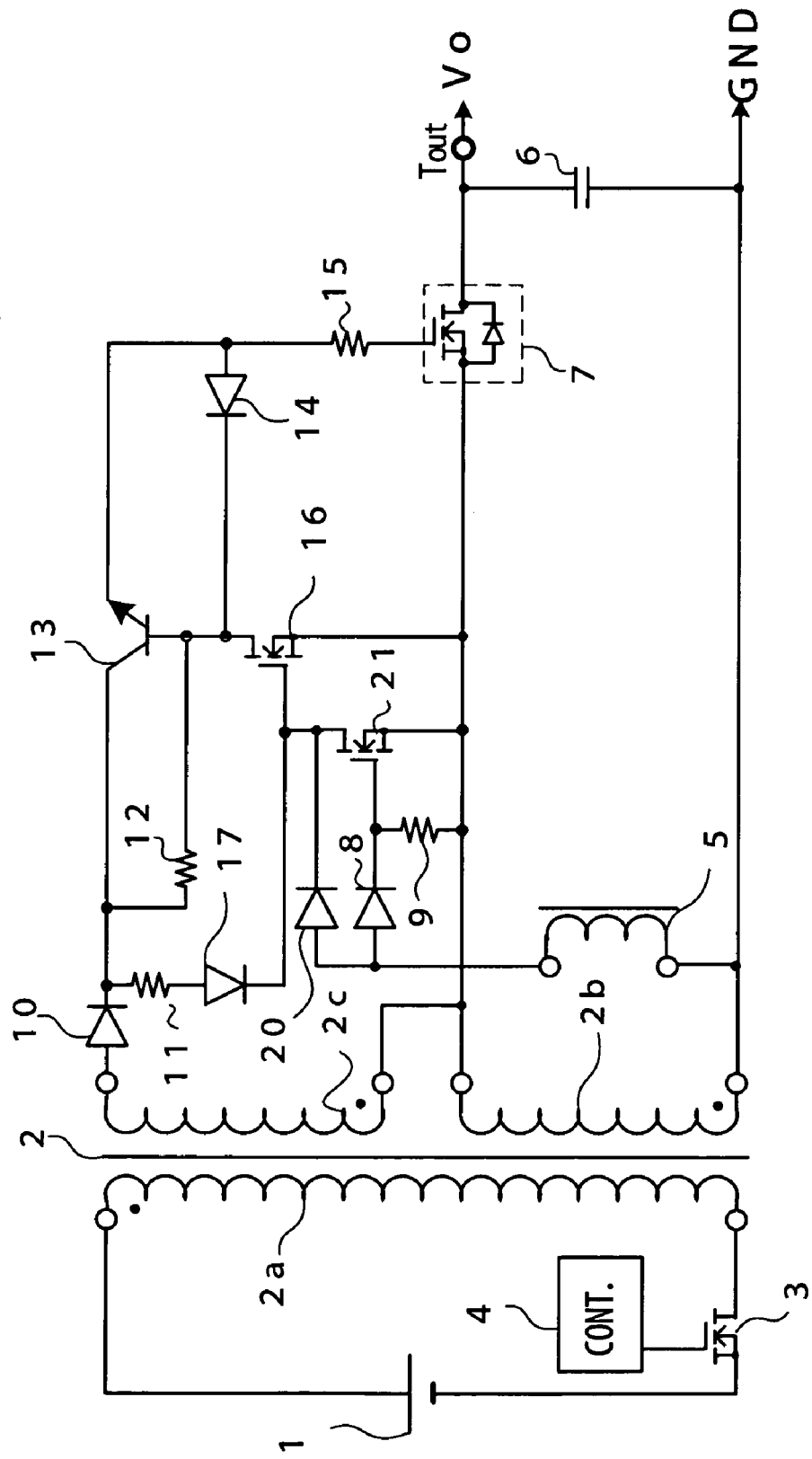
FIG. 4 is a circuit diagram illustrating a switching power supply device according to a third embodiment of the invention.

FIG. 4 is a circuit diagram illustrating a switching power supply device according to a third embodiment of the invention, and components common to those of the second embodiment in FIG. 3 will be denoted by the same reference numerals.

The switching power supply apparatus replaces the transistor 18 of the second embodiment by a NMOS 21. The remaining structures are the same as those of the switching power supply device of the second embodiment.

The gate of the NMOS 21 is connected to the node between the cathode of the diode 8 and the resistor 9, and the drain of the NMOS 21 is connected to the cathodes of the diodes 17, 20, and the gate of the NMOS 16. The source of the NMOS 21 is connected to the cold side of the secondary winding 2b of the transformer 2.

In the switching power supply device, in a case where the voltage drop at the resistor 9 due to the current IL flowing from the reactor 5 is higher than the threshold of the NMOS 21, the NMOS 21 turn on. In a case where the voltage drop at the resistor 9 due to the current IL becomes lower than the threshold of the NMOS 21, the NMOS 21 turns off. When the NMOS 21 turns off, the NMOS 16 turns on. Accordingly, the NMOS 7 turns off, and the synchronous rectification is stopped.

The gate voltage of the NMOS 21 differs from the base-emitter voltage of the transistor 18, and is not to be clamped to a constant voltage even if the NMOS 21 is in an on state. Accordingly, by the equation (1), increments of the current IL flowing from the reactor 5 and the voltage drop at the resistor 9 significantly shortens a time until the current IL flowing from the reactor 5 becomes zero in comparison with the secondary current IT flowing through the secondary winding 2b. As the diode 20 flows the current IL from the reactor 5 into the drain of the NMOS 21 after the NMOS 21 turns on, the diode 20 so functions as to suppress the voltage drop at the current-detection resistor 9 within 1 to 2 V or so in the vicinity of the threshold of the NMOS 21. Therefore, greatly shortening the time until the current IL becomes zero can be prevented in comparison with the secondary current IT. In this case too, when the NMOS 16 has a low threshold, or a bipolar transistor is used instead of the NMOS 16, it is necessary to divide the drain voltage of the NMOS 21 by using a voltage-dividing resistor or the like, and apply the divided voltage to the gate of the NMOS 16 or the base of the bipolar transistor.

(Fourth Embodiment)

Figure 5:
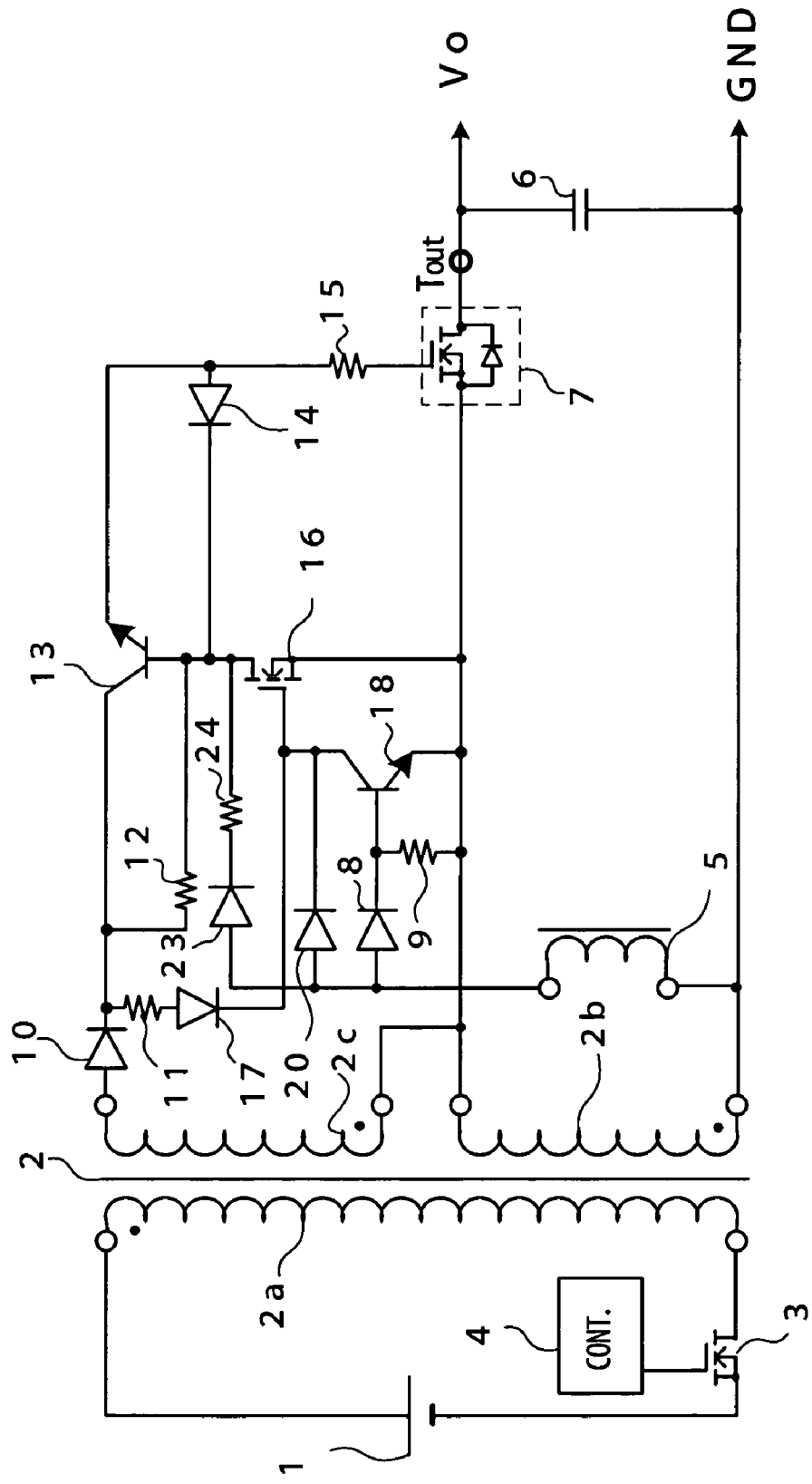
FIG. 5 is a circuit diagram illustrating a switching power supply device according to a fourth embodiment of the invention.

FIG. 5 is a circuit diagram illustrating a switching power supply device according to a fourth embodiment of the invention, and components common to those of the second embodiment in FIG. 3 will be denoted by the same reference numerals.

The switching power supply device includes a diode 23 and a resistor 24. The remaining structures are the same as those of the switching power supply device of the second embodiment.

The anode of the diode 23 is connected to the one end of the reactor 5, the anodes of the diode 8, 20. The cathode of the diode 23 is connected to one end of the resistor 24, and the other end of the resistor 24 is connected to node between the base of the transistor 13 and the drain of the NMOS 16.

In flyback converters, ringing is generated when a main switching element is in an off state and the release of energies in the transformer 2 is finished. In the switching power supply apparatus of the second embodiment, ringing is generated when the NMOS 3 is in an off state and the release of the energy in the transformer 2 is finished, and a sine-wave voltage which is equal to the output voltage Vo is generated at the secondary winding 2b. The reactor 5 also stores and releases the energy by that sine-wave voltage.

To do synchronous rectification maximally, setting the resistance value of the resistor 9 in such a way that the NMOS 7 keeps being in an on state just before the current IL flowing through the reactor 5 becomes zero may cause the transistor 18 to be maintained in the on state in the period of the ringing, and the NMOS 7 may be so driven as to turn on.

The switching power supply device of the embodiment of the invention can resolve the problem of the switching power supply device as such a flyback converter.

When the release of the energy in the transformer 2 is finished, and the secondary current IT flowing from the secondary winding 2b becomes zero, the current IL flowing from the reactor 5 becomes also zero. This causes the transistor 18 to turn off, and the NMOS 16 to turn on. Subsequently, because of the generation of the ringing, in flowing the current IL again through the reactor 5 by the ringing voltage, the current IL flows into the NMOS 16 via the diode 23 and the resistor 24 in addition to the resistor 9.

Given that the on resistance of the NMOS 16 is, for example, 200 mΩ, and the current maximally flowing through the NMOS 16 is 50 mA, the drain-source voltage of the NMOS 16 is 10 mV, and is significantly smaller than approximately 0.6V threshold between the base and emitter of the transistor 18. Consequently, with the drain-source voltage of the NMOS 16 being neglected, and the forward voltage of the diode 8 being equal to that of the diode 23, the transistor 18 is to be turn on when the voltage drop due to the combined resistance of the resistor 9 and the resistor 24 becomes lower than the threshold of the transistor 18. In fact, with the values of resistances of the resistor 9 and the resistor 24 being $R_9$ and $R_{24}$, respectively, and when the current IL becomes like $$IL2=VBE(R_9+R_{24})/(R_9 \cdot R_{24})$$

the transistor 18 is to turn on.

Because of the capacitance between the gate and source of the NMOS 16, the gate voltage of the NMOS 16 is held until the transistor 18 turns on, and setting the value of resistance $R_{24}$ of the resistor 24 in such a way that IL2 becomes larger than the current flowing through the reactor 5 due to the ringing prevents the NMOS 7 from being driven so as to turn on in the ringing period.

In a case where a bipolar transistor is used instead of the NMOS 16, the similar effects can be obtained by connecting a capacitor between the cathode of the diode 17 and the cold side of the secondary winding 2b and maintaining the base-voltage of the bipolar transistor by the capacitor, thereby keeping flowing the base current.

As the NMOS 3 as the main switching element turns on, the voltage at the hot side terminal of the secondary winding 2C becomes higher than that of the cold side terminal of the secondary winding 2C. Thus, there is no voltage to drive the gate of the NMOS 16 through the diode 10, the resistor 11, and the diode 17, and the NMOS 16 turns off, and no current flows through the resistor 24. Accordingly, it is possible to set the current IL which flows through the reactor 5 when the transistor 18 is in an off state by the value of resistance of the resistor 9, and turn the NMOS 7 off just before the current IL flowing through the reactor 5 becomes zero.

In a case of a flyback converter which feeds back the state of the load and adjusts the length of the on period of the main switching element, when the load is light, the secondary current IT of the secondary winding 2b may decrease. In this case, the loss may decrease. However, the electrical power for driving the NMOS 7 is the same in both of the heavy load and light load. So sometimes, the loss because of doing synchronous rectification may become larger than that of not-doing synchronous rectification.

In the switching power supply device of the embodiment, when the on period of the NMOS 3 with a light load is short, the current IL flowing through the reactor 5 decreases, and the transistor 18 does not turn on, thus undoing the synchronous rectification. Therefore, the switching power supply device of the embodiment can achieve an effect such that the loss with a light load is reduced.

(Fifth Embodiment)

Figure 6:
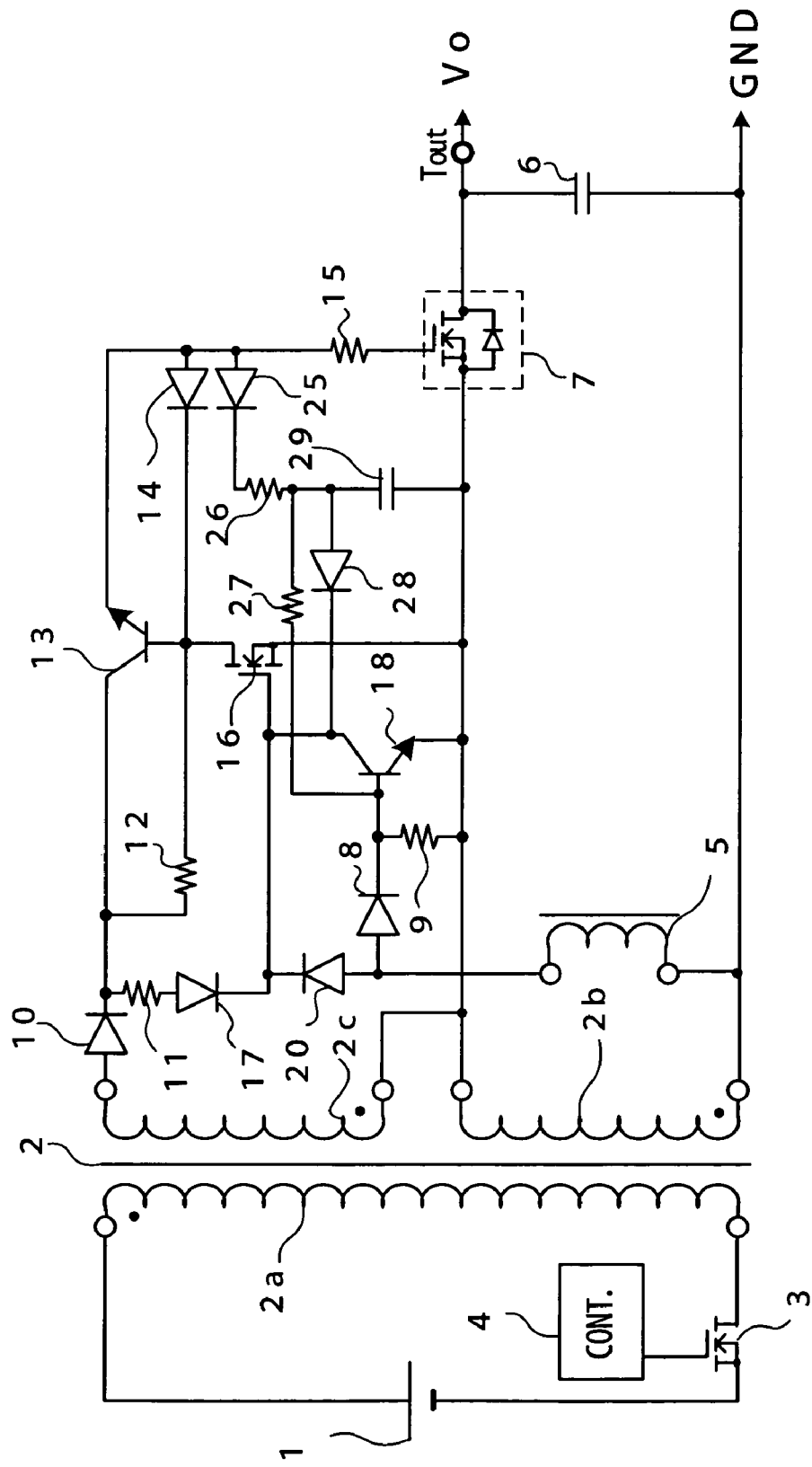
FIG. 6 is a circuit diagram illustrating a switching power supply device according to a fifth embodiment of the invention.

FIG. 6 is a circuit diagram illustrating a switching power supply device according to a fifth embodiment of the invention, and components common to those of the second embodiment in FIG. 3 will be denoted by the same reference numerals.

The switching power supply device comprises a diode 25, resistors 26, 27, a diode 28, and a capacitor 29, and the structures which are the same as those of the switching power supply device of the second embodiment.

The anode of the diode 25 is connected to the node between the one end of the resistor 15 and the emitter of the transistor 13, and the cathode of the diode 25 is connected to one end of the resistor 26. The other end of the resistor 26 is connected to one end of the resistor 27, the anode of the diode 28, and one electrode of the capacitor 29. The other end of the resistor 27 is connected to the base of the transistor 18. The cathode of the diode 28 is connected to the collector of the transistor 18. The other electrode of the capacitor 29 is connected to the cold side of the secondary winding 2b of the transformer 2.

The switching power supply device achieves the similar effects to those of the switching power supply device of the fourth embodiment, and prevents the NMOS 7 to turn on when ringing is generated and the load is not heavy.

When the NMOS 3 which is the main switching element is in an on state, or no voltage is applied to the gate of the synchronous rectification NMOS 7 in a ringing period, only the current IL which flows through the reactor 5 flows into the resistor 9. With the value IL3 of the current IL which flows through the reactor 5 when the transistor 18 turns on in that condition being expressed by the base-emitter voltage $V_{BE}$ of the transistor 18 and the value of resistance $R_9$ of the resistor 9, the IL3 can be expressed as follows:

$IL3 = V_{BE}/R_9$

Accordingly, by setting the value of resistance $R_9$ of the resistor 9 in such a way that the current value IL3 becomes greater than the current IL which flows through the reactor 5 in the ringing period and when the load is not heavy, it is possible to prevent the transistor 18 to turn on, thus preventing the NMOS 7 to turn on in the ringing period and when the load is not heavy.

In contrast, in a condition where the gate of the NMOS 7 is driven and the NMOS 7 is in an on state, a bias current flows into the resistor 9 from the gate of the NMOS 7 via the diode 25, and the resistors 26, 27.

At this time, because of the diode 28, the voltage at the node between the resistor 26 and the resistor 27 becomes the sum of the collector-emitter voltage $V_{CE}$ of the transistor 18 and a forward voltage $V_F$ of the diode 28. As mentioned above, at the transistor 18, as the collector-emitter voltage $V_{CE}$ becomes equal to the base-emitter voltage $V_{BE}$, the node between the resistor 26 and the resistor 27 is clamped by the value of $V_{BE}+V_F$. Therefore, when the transistor 18 is in an on state, with the value of resistance of the resistor 27 being $R_{27}$, the bias current of $V_F/R_{27}$ flows through the resistor 9.

In a case where a voltage generated at the resistor 9 becomes lower than the threshold of the transistor 18 by the sum of the current IL which flows through the reactor 5 and a current which is biased through the resistor 27, the transistor 18 turns off. Given that the value of the current IL which flows through the reactor 5 when the transistor 18 turns off being IL4, by setting the switching power supply device so as to satisfy the following equation:

$IL4+V_F/R_{27}=V_{BE}/R_9$ that is, $R_{27}=V_F/(IL3-IL4)$, it is possible to suppress that the NMOS 7 turns on when ringing is generated and the load is not heavy.

There is fear that the voltage at the node of the resistors 26, 27 increases in a short period until the NMOS 16 turns on and the gate voltage of the NMOS 7 lowers after the transistor 18 turns off, and the bias at the resistor 9 increases, thereby turning on the transistor 18 again, but as the capacitor 29 delays increase of the voltage at the node of the resistors 26, 27, and this makes it possible to prevent the transistor 18 to turn on again.

It is possible to directly flow the bias current into the resistor 9 from the gate of the NMOS 7 or the auxiliary winding 2c by using a resistor and a diode without stabilizing the bias current which is to be flown into the resistor 9, in this case, however, it is necessary to set the bias in view of the change in the voltage generated at the auxiliary winding 2c and the temperature characteristic of the transistor.

(Sixth Embodiment)

Figure 7:
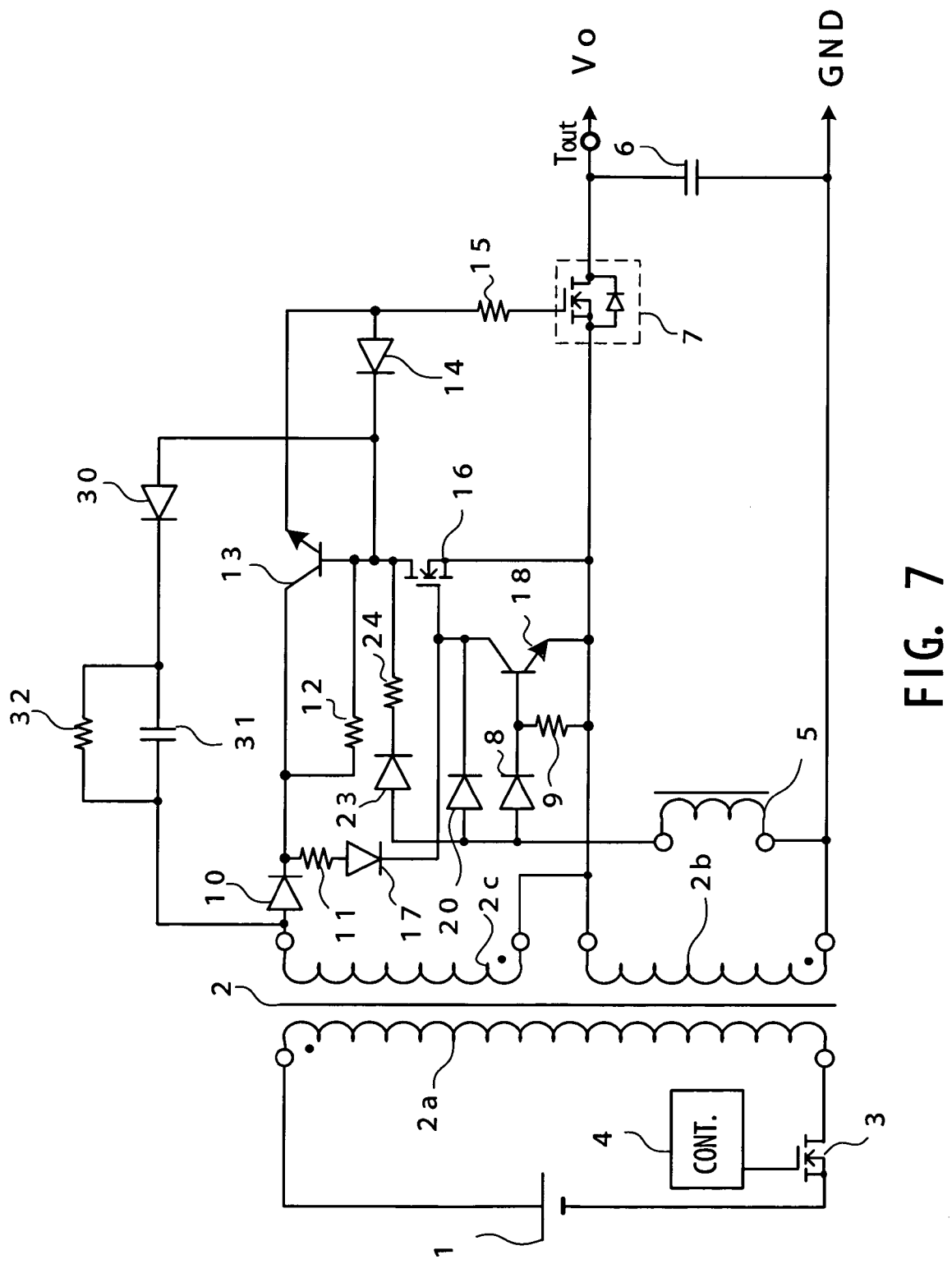
FIG. 7 is a circuit diagram illustrating a switching power supply device according to a sixth embodiment of the invention.

FIG. 7 is a circuit diagram illustrating a switching power supply device according to a sixth embodiment of the invention, and components common to those of the fourth embodiment in FIG. 5 will be denoted by the same reference numerals.

This switching power supply device comprises a diode 30, a capacitor 31, a resistor 32, and the structures which are the same as those of the switching power supply device of the fifth embodiment.

The anode of the diode 30 is connected to the cathode of the diode 14, and the cathode of the diode 30 is connected to one electrode of the capacitor 31. The other electrode of the capacitor 31 is connected to the cold side of the auxiliary winding 2c of the transformer 2. The resistor 32 is connected between both terminals of the capacitor 31.

Flyback converters may not generate a voltage for driving the gate of the NMOS 16 from the cold side of the secondary winding 2c when the output voltage Vo is low, for example, during the starting period. Consequently, even if a current which flows through the reactor 5 becomes zero and the transistor 18 turns off, a predetermined voltage is not generated at the gate of the NMOS 16, and this results in the indeterminate gate voltage of the NMOS 7. In this manner, in a case where the NMOS 3 as the main switching element turns on, and the voltage at the source of the NMOS 7 becomes low with respect to the voltage at the drain of the NMOS 7 with the voltage at the gate of the NMOS 7 being indeterminate, an input capacitance is charged through a feedback capacitance of the NMOS 7, and a voltage is generated at the gate of the NMOS 7. Because of this gate voltage, there is fear that the NMOS 7 turns on and a penetration current flows.

In contrast, in the switching power supply device of the embodiment, in a case where the NMOS 16 is in an off state and the NMOS 3 turns on, the voltage at the source of the NMOS 7 becomes low with respect to the drain thereof, and the electric potential of the cold side of the auxiliary winding 2c becomes further low with respect to the electric potential of the source of the NMOS 7. Accordingly, the feedback capacitance of the NMOS 7 is charged through the diode 14, the diode 30, and the capacitor 31. As the electric potential of the cathode of the diode 14 becomes low with respect to the source of the NMOS 7 by the forward voltage of the parasitic diode of the NMOS 16, the gate voltage of the NMOS 7 becomes almost 0V, and does not turn on. Moreover, no negative overload voltage is applied.

(Seventh Embodiment)

Figure 8:
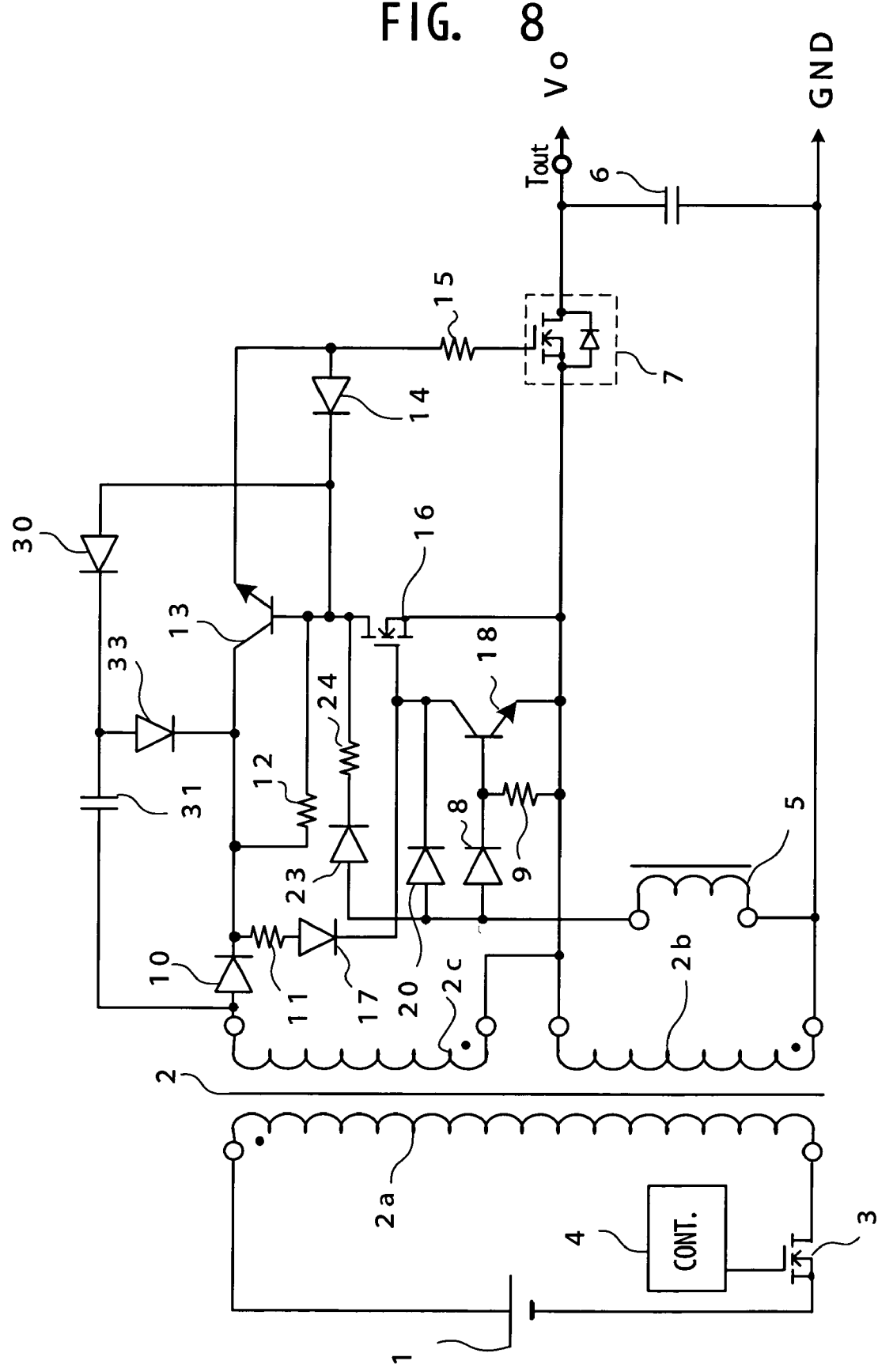
FIG. 8 is a circuit diagram illustrating a switching power supply device according to a seventh embodiment of the invention.

FIG. 8 is a circuit diagram illustrating a switching power supply device according to a seventh embodiment of the invention, and components common to those of the sixth embodiment in FIG. 7 will be denoted by the same reference numerals.

The switching power supply device includes a diode 33 instead of the resistor 32 of the switching power supply device of the sixth embodiment. The anode of the diode 33 is connected to the node between the cathode of the diode 30 and the capacitor 31, and the cathode of the diode 33 is connected to the collector of the transistor 13.

In the sixth embodiment, the charge stored in the capacitor 31 in an on period of the NMOS 3 is discharged by the resistor 32, but in the switching power supply device of the embodiment, the charge stored in the capacitor 31 is supplied to the gate of the NMOS 7 through the collector of the transistor 13. That is, the charge stored in the capacitor 31 is used for driving the NMOS 7, and this results in making efficient use of the charge.

(Eighth Embodiment)

Figure 9:
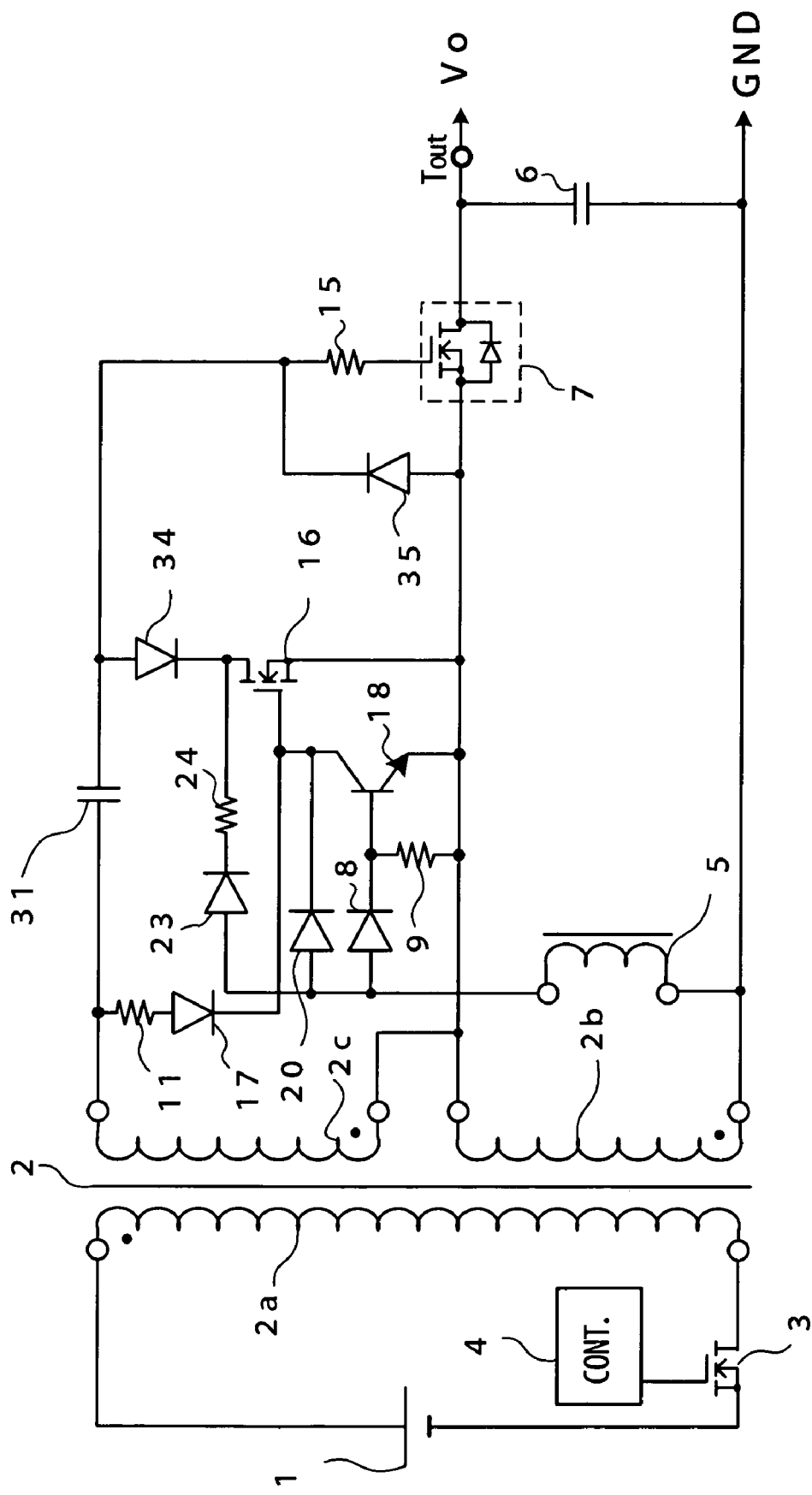
FIG. 9 is a circuit diagram illustrating a switching power supply device according to an eighth embodiment of the invention.

FIG. 9 is a circuit diagram illustrating a switching power supply device according to an eighth embodiment of the invention, and the components common to those of the sixth embodiment in FIG. 7 will be denoted by the same reference numbers.

The switching power supply device eliminates the transistor 13 and diodes 10, 14 in the switching power supply device of the sixth embodiment, and includes diodes 34, 35.

The one electrode of the capacitor 31 is connected to the gate of the NMOS 7 via the resistor 15, and the other electrode of the capacitor 31 is directly connected to the cold side of the auxiliary winding 2c. The anode of the diode 34 is connected to the one electrode of the capacitor 31, while the cathode of the diode 34 is connected to the node between the resistor 24 and the drain of the NMOS 16. The anode of the diode 35 is connected to the source of the NMOS 7, while the cathode of the diode 35 is connected to the gate of the NMOS 7 through the resistor 15.

In this switching power supply device, the synchronous rectification NMOS 7 is driven by the capacitor 31. The capacitor 31 is charged by the voltage induced in the secondary winding 2c through the diode 35 when the NMOS 3 as the main switching element is on. When the NMOS 3 as the main switching element turns off and a voltage at the auxiliary winding 2c is inverted, the NMOS 7 is turned on by the charge stored in the capacitor 31 and the voltage induced in the auxiliary winding 2c. The capacitor 31 is enough if it can drive the gate of the NMOS 7, thus the capacitance of the capacitor 31 may be a small value.

As the current IL which flows through the reactor 5 decreases and the NMOS 16 turns on, the NMOS 16 turns on. Therefore, the electrical charges are released from the gate of the NMOS 7 through the diode 34 so that the NMOS 7 turns off. Thus, the capacitor 31 becomes a state that the one electrode is connected to the hot side of the auxiliary winding 2c, and inversely charged. The charge of the capacitor 31 is kept undergone until the charge voltage of the capacitor 31 becomes equal to the voltage which is generated by the auxiliary winding 2c. After that, no current flows through the auxiliary winding 2c. Thus, the loss of the power is small. Further, the capacitance of the capacitor 31 may be relatively small, thus the valued of the current flowing through the auxiliary winding 2c is small.

The diode 34 prevents the current IL which flows through the reactor 5 from flowing back into the one electrode of the capacitor 31.

In the above-described switching power supply apparatus, the transistor 13 can be eliminated, and the NMOS 7 can be driven by the capacitor 31 which is cheaper than the transistor 13. It is possible to reduce the number of elements of the diodes and the resistors, thereby reducing the cost of the switching power supply device.

(Ninth Embodiment)

Figure 10:
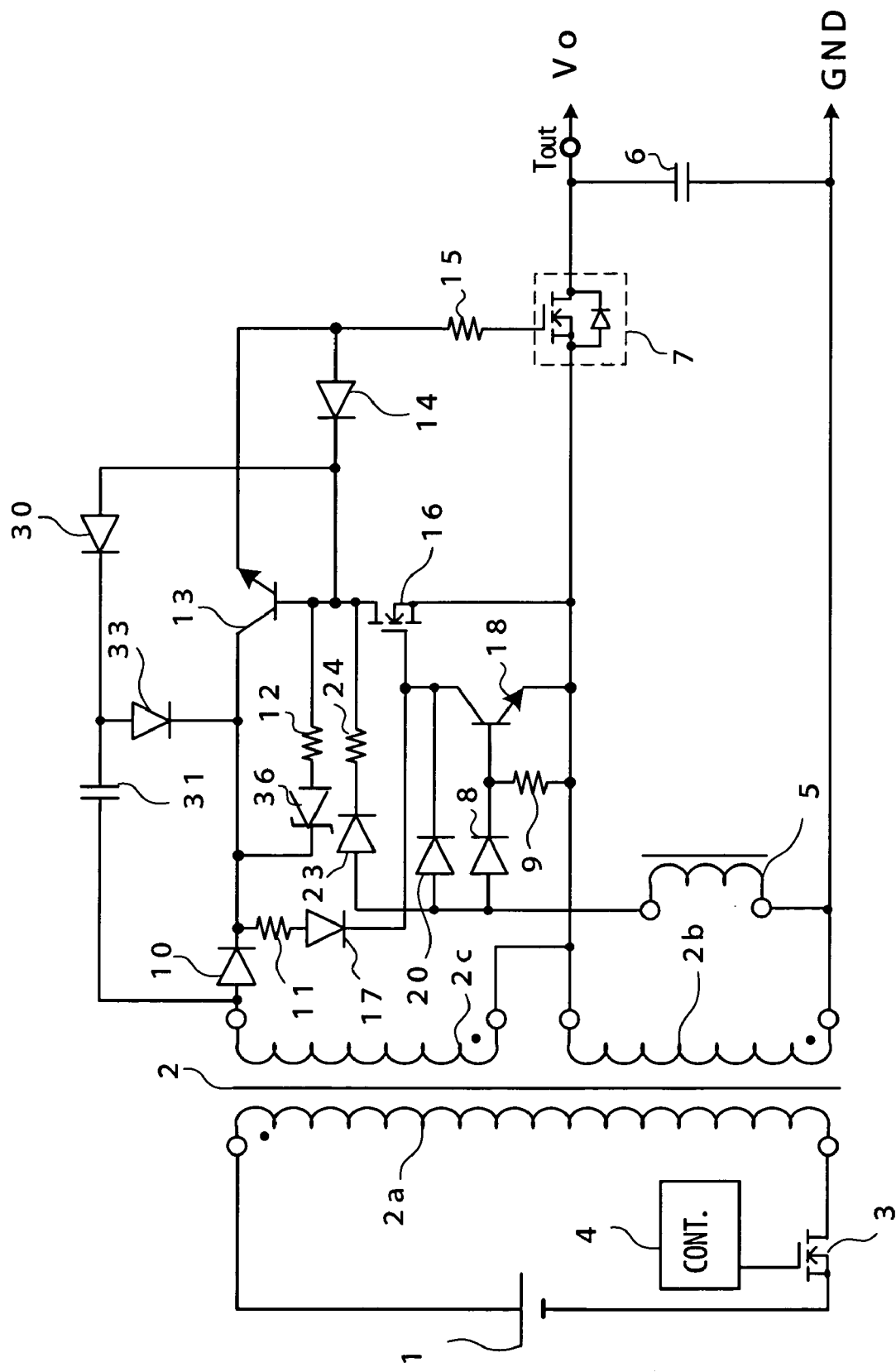
FIG. 10 is a circuit diagram illustrating a switching power supply device according to a ninth embodiment of the invention.

FIG. 10 is a circuit diagram illustrating a switching power supply device according to a ninth embodiment of the invention, and components common to those of the seventh embodiment in FIG. 8 will be denoted by the same reference numerals.

The switching power supply device comprises a Zener diode 36.

The cathode of the Zener diode 36 is connected to the cathode of the diode 10, while the anode of the Zener diode 36 is connected to the one end of the resistor 12, and the other end of the resistor 12 is connected to the base of the transistor 13.

In the switching power supply device, in a case where the output voltage Vo is low during starting or the like and the voltage which is generated by the auxiliary winding 2c is low, the Zener diode 36 prevents flow of the base current into the transistor 13. This makes it possible to suppress an unstable operation which is likely to occur during the starting or the like.

(Tenth Embodiment)

Figure 11:
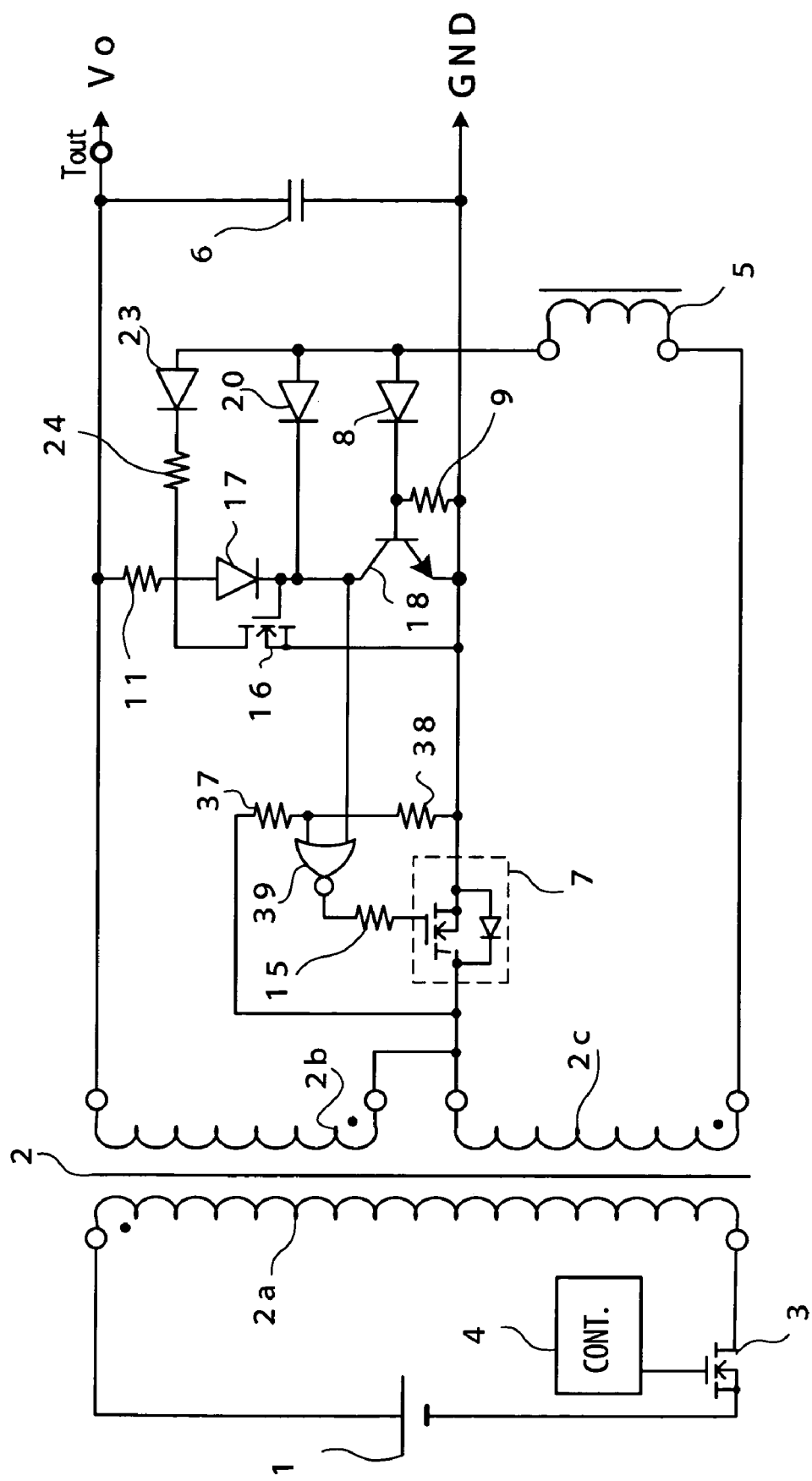
FIG. 11 is a circuit diagram illustrating a switching power supply device according to a tenth embodiment of the invention.

FIG. 11 is a circuit diagram illustrating a switching power supply device according to a tenth embodiment of the invention, and components common to those of the fourth embodiment in FIG. 5 will be denoted by the same reference numerals.

The switching power supply device comprises the DC power source 1, the transformer 2, the NMOS 3 which is the main switching element, and the controller which controls on/off operations of the NMOS 3. The DC power source 1 and the NMOS 3 are connected to the transformer 2 in similar ways to those of the first to ninth embodiments.

The cold side of the secondary winding 2b of the transformer 2 is connected to the one end of the resistor 11 and the one electrode of the capacitor 6. The other electrode of the capacitor 6 is connected to the ground GND.

The hot side of the secondary winding 2b is connected to one end of a resistor 37, the cold side of the auxiliary winding 2c, and the drain of the synchronous rectification NMOS 7. The other end of the resistor 37 is connected to one end of a resistor 38, and the other end of the resistor 38 is connected to the source of the NMOS 7. The source of the NMOS 7 is connected to the ground GND.

The hot side of the auxiliary winding 2c is connected to the one end of the reactor 5. The other end of the reactor 5 is connected to the anodes of the diodes 8, 20, and 23. The cathode of the diode 8 is connected to the ground GND via the resistor 9, and is connected to the base of the transistor 18.

The cathode of the diode 20 is connected to the collector of the transistor 18, and the emitter of the transistor 18 is connected to the ground GND. The anode of the diode 17 is connected to the other end of the resistor 11, while the cathode of the diode 17 is connected to the collector of the transistor 18.

The cathode of the diode 17 is further connected to the gate of the NMOS 16. The cathode of the diode 23 is connected to the one end of the resistor 24, and the other end of the resistor 24 is connected to the drain of the NMOS 16. The source of the NMOS 16 is connected to the ground GND.

The node between the resistor 37 and the resistor 38 is connected to one input terminal of a two-input NOR circuit 39. The other input terminal of the NOR circuit 39 is connected to the collector of the transistor 18. The output terminal of the NOR circuit 39 is connected to the gate of the NMOS 7 via the resistor 15.

In the switching power supply device connected as described above, the reactor 5 stores and releases energy in accordance with the voltage which is generated by the auxiliary winding 2c. The resistor 9 detects the current IL which flows through the reactor 5, and as similar to the switching power supply devices of the first to ninth embodiments, the transistor 18 turns on based on the current which flows through the reactor 5.

The on action of the transistor 18 causes a low-level signal to be input into the other input terminal of the NOR circuit 39. The off action of the transistor 18 causes a high-level signal to be input into the other input terminal of the NOR circuit 39.

The resistances 37 and 38 in series are connected between the source and drain of the NMOS 7. Therefore, when the NMOS (main switch) 3 is on, the voltage across the secondary winding 2b and the output voltage Vo is applied to the resisters 37 and 38. When the NMOS 3 is off, the parasitic diode of the NMOS 7 is forward-biased. Therefore, a low voltage is applied to the resistors 37 and 38. Therefore, the connection node between the resistors 37 and 38, i.e., one input terminal of the NOR circuit 39 is at a high voltage when the NMOS 3 is on, and at a low voltage when the NOMS 3 is off.

Therefore, the NOR circuit 39 outputs a high-voltage level signal when a current grater than a predetermined current level flows through the reactor 5 to turns on the transistor 18 and the NMOS 3 as the main switch is off. The high-voltage level output signal from the NOR circuit 39 drives or turned on the NMOS 7.

In the switching power supply devices of the first to ninth embodiments, as the gate of the NMOS 7 is driven by the voltage which is generated by the auxiliary winding 2c, it is difficult to set the voltage which is generated by the auxiliary winding 2c at a low level too much, but in this embodiment, as the auxiliary winding 2c is used only for storing and releasing the energy of the reactor 5, it is possible to reduce the number of turns ns, and this makes it possible to replace the reactor 5 by a small and inexpensive one.

(Eleventh Embodiment)

Figure 12:
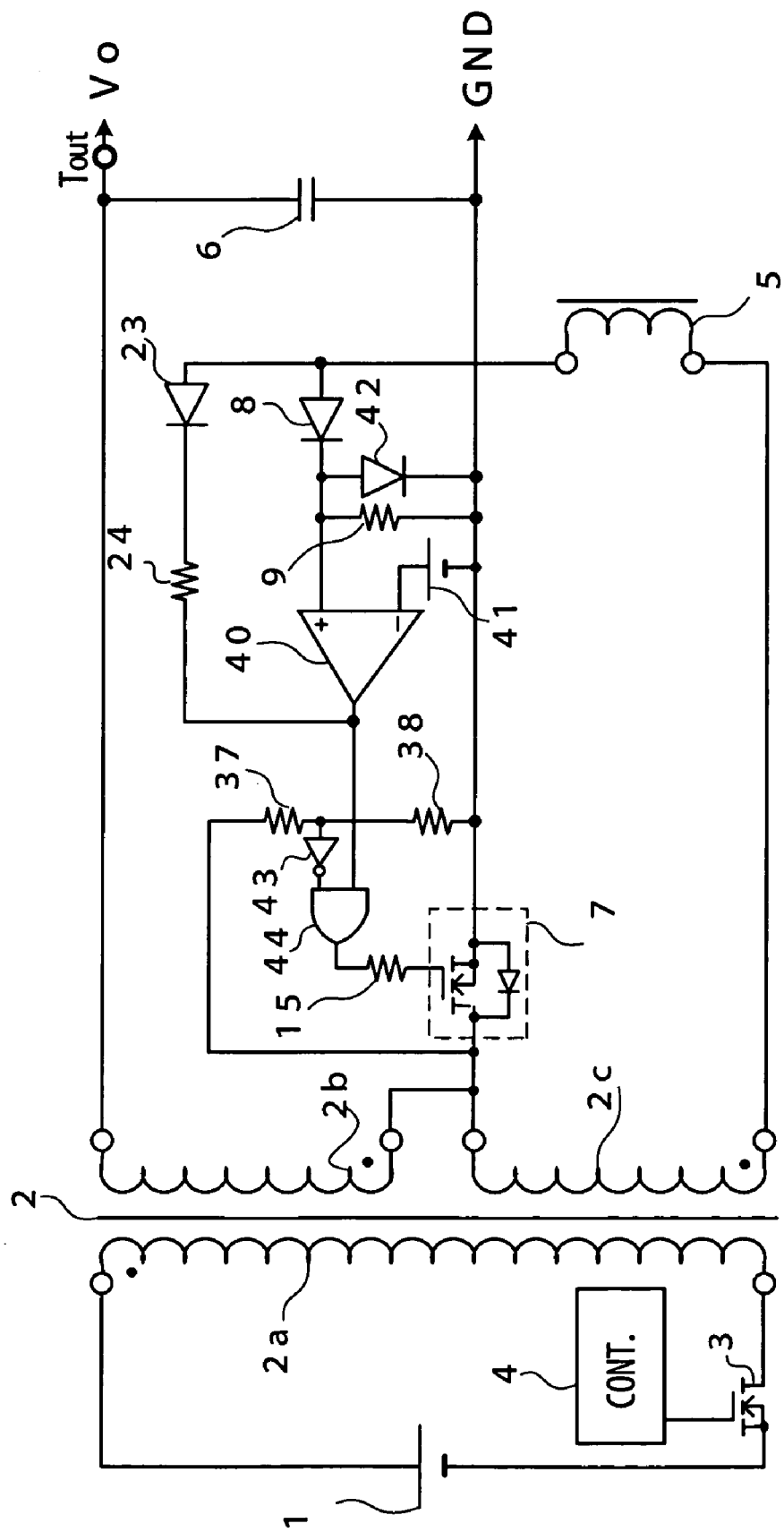
FIG. 12 is a circuit diagram illustrating a switching power supply device according to an eleventh embodiment of the invention.
Figure 13:
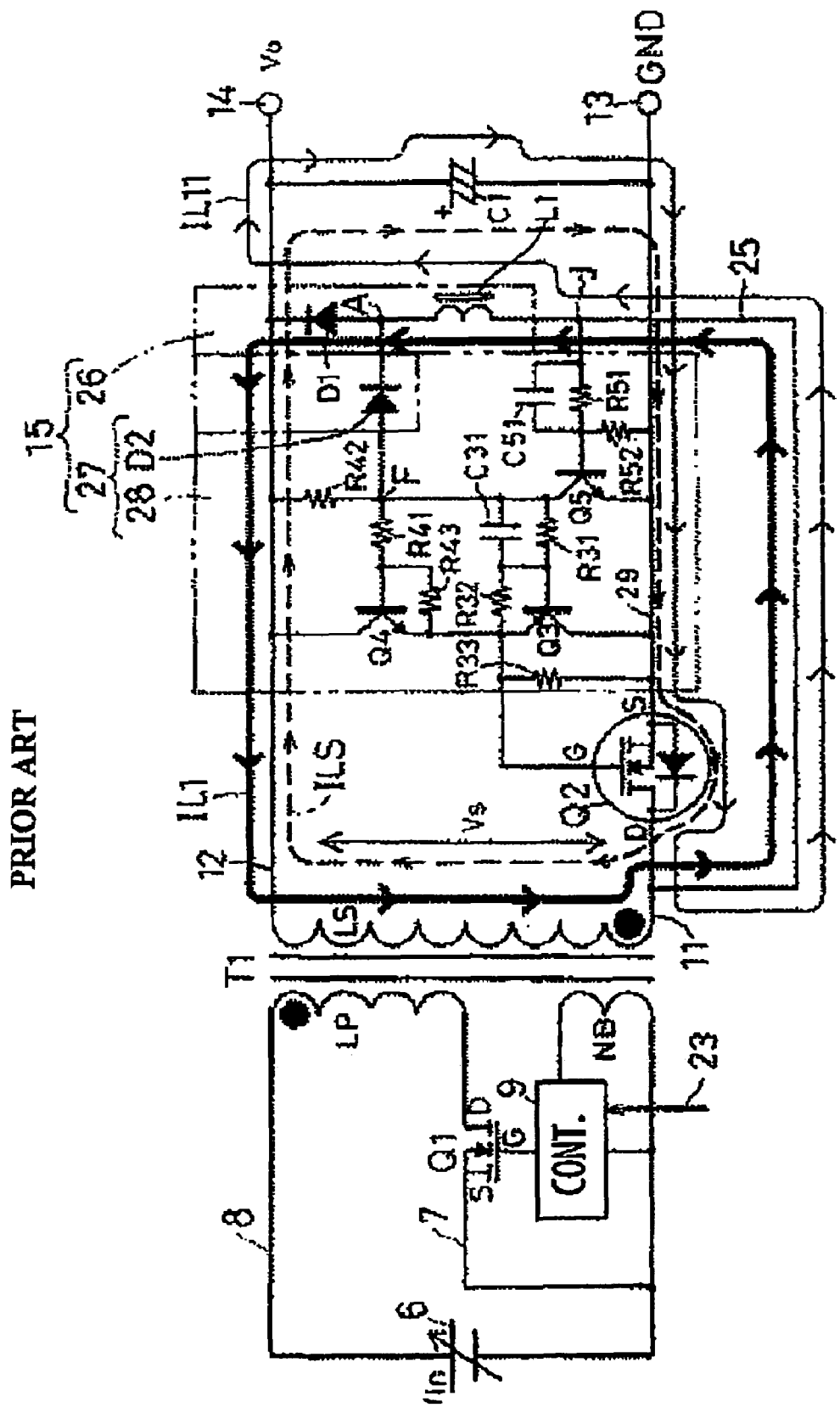
FIG. 13 is a circuit diagram illustrating a conventional switching power supply apparatus.

FIG. 12 is a circuit diagram illustrating a switching power supply device according to an eleventh embodiment of the invention, and components common to those of the tenth embodiment in FIG. 11 will be denoted by the same reference numerals.

This switching power supply device is the switching power supply device of the tenth embodiment which eliminates the diodes 17, 20, the resistor 11, the transistor 18, the NMOS 16, and the NOR circuit 39, but includes a comparator 40, a reference voltage generator 41, a diode 42, an inverter 43, and an AND circuit 44.

The diode 8 with its anode connected to the other end of the reactor 5 is connected to the one end of the resistor 9 as same as the tenth embodiment, and is connected to one input terminal of the comparator 40, and the anode of the diode 42. The cathode of the diode 42 is connected to the other end of the resistor 9 and the ground GND. A reference voltage which is generated by the reference voltage generator 41 is input into the other input terminal of the comparator 40. The reference voltage is lower than the forward voltage of the diode 42.

The cathode of the diode 23 with the anode connected to the other electrode of the reactor 5 is connected to the one end of the resistor 24, and the other end of the resistor 24 is connected to the output terminal of the comparator 40.

As same as the tenth embodiment, the series circuit of the resistors 37, 38 is connected between the drain of the NMOS 7 and the source thereof. The input terminal of the inverter 43 is connected to the node between the resistor 37 and the resistor 38, while the output terminal of the inverter 43 is connected to one input terminal of the AND circuit 43. The other input terminal of the AND circuit 43 is connected to the output terminal of the comparator 40. The output terminal of the AND circuit 43 is connected to the drain of the NMOS 7 via the resistor 15.

In the switching power supply device, the comparator 40 compares the voltage drop at the resistor 9 with the reference voltage generated by the reference voltage generator 41 and output a high level signal to one input terminal of the AND circuit 44 when the voltage drop at the resistor 9 is greater than the reference voltage, that is, a current greater than a predetermined level flows through the reactor 5. The resistors 37 and 38 are connected between the drain and source of the NMOS 7 in series. Therefore, the connection node between the resistors 37 and 38 is at a high level when the NMOS 3 is on, and is at a low level when the NMOS 3 is off. The connection node of resistors 37 and 38 is connected to another input terminal of the AND circuit 44 through an inverter circuit 43. Therefore, the AND circuit 44 output a high level signal when the NMOS 3 is on, and the current greater than the predetermined current level is flowing through the reactor 5, to turns on the NMOS 7. The diode 42 clamps the voltage drop at the register 9 at the forward voltage of it to protect the comparator 40. In this embodiment, the detection of the current flowing through the reactor 5 is performed by comparing the voltage drop at resistor 9 and the reference voltage. The reference voltage has a small change due to a temperature change in comparison with the base-emitter voltage of a transistor. Accordingly, the comparison result of the comparator 40 becomes stable. Therefore, changing in the on/off timings of the NMOS 7 in accordance with a temperature change can be suppressed.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2004-336008 filed on Nov. 19, 2004 and including specification, claims, drawings and summary. The disclosure of the above Japanese Patent Application is incorporated herein by reference in its entirety.

What is claimed is:

1. A switching power supply device comprising:
   a transformer with a primary and a secondary winding;
   a main switching element which switches a current flowing through said primary winding;
   a controller which controls an operation of said main switching element;
   a smoothing circuit;
   a rectifying switching element which connects and disconnects between said secondary winding and said smoothing circuit; and
   a rectifying-element drive circuit which drives said rectifying switching element, and includes
   a reactor of which one end is connected to one end of said secondary winding stores energy during an on period of said main switching element, and releases said stored energy during an off period of said main switching element,
   a current detection circuit which is connected between an other end of said reactor and an other end of said secondary winding, detects the current value of the current flowing through the reactor, and which generates a signal indicating the current value, and
   a drive circuit which receives said signal indicating said current value, and turns on said rectifying switching element in said off period of said main switching element when said current flowing through said reactor is greater than or equal to a predetermined value, and turns off said rectifying switching element when said current flowing through said reactor is less than said predetermined value.

2. The switching power supply device according to claim 1, wherein said current detection circuit includes a current detection resistor having one end connected to said other end of said reactor and an other end connected to said other end of said secondary winding, and
   said drive circuit includes a transistor with a control electrode (base), and a first and a second conduction electrode (emitter, collector) which change conduction states based on a signal supplied to said control electrode, said control electrode (base) being connected to said other end of reactor, said first conduction electrode (emitter) being connected to said other end of secondary winding, and
   said drive circuit receives a voltage drop at said current detection resistor as said signal indicating said current value, and turns off said rectifying switching element, when the voltage drop at the current detection resistor due to said current flowing through said reactor becomes lower than a threshold of said transistor.

3. The switching power supply device according to claim 2, wherein said transistor is a bipolar transistor whose base, emitter, and collector respectively correspond to said control electrode, said first conduction electrode, and said second conduction electrode.

4. The switching power supply device according to claim 2, wherein said transistor is a MOS transistor whose gate, source, and drain respectively correspond to said control electrode, said first conduction electrode, and said second conduction electrode.

5. The switching power supply device according to claim 2, wherein said drive circuit includes an off-control switch which has a current path with one end (source) connected to said secondary winding, and an other end (drain) connected to a control terminal of said rectifying switching element, and a control terminal (gate) connected to an auxiliary winding connected to said secondary winding in series, and said second conduction electrode of said transistor, turns on, reducing a voltage at said control terminal of said rectifying switching element, when said transistor is turned off.

6. The switching power supply device according to claim 2, wherein said drive circuit includes a current bypass diode whose anode and cathode respectively connected to said reactor, and said second conduction electrode of said transistor.

7. The switching power supply device according to claim 5, wherein said drive circuit includes a hysteresis circuit which includes a resistor and a diode, is connected between said reactor and said other end of said current path of said off-control switch, and permits said current flowing through said reactor to partly flow through said off-control switch during an on period of said off-control switch.

8. The switching power supply device according to claim 5, wherein said drive circuit includes a bias circuit which ensures a current flow to said current detection circuit from said auxiliary winding or said control terminal of said rectifying switching element via a resistor.

9. The switching power supply device according to claim 5, wherein said rectifying-element drive circuit includes a capacitor which is connected between said control terminal of said rectifying switching element and said auxiliary winding, and has a function of reducing a voltage at said control terminal of said rectifying switching element.

10. The switching power supply device according to claim 5, wherein said rectifying-element drive circuit includes a capacitor which is connected between said control terminal of said rectifying switching element and said auxiliary winding, and has a function of reducing a voltage at said control terminal of said rectifying switching element, and a function of driving said rectifying switching element.

11. The switching power supply device according to claim 5, wherein said drive circuit includes a drive transistor whose emitter, base, and collector are respectively connected to said control terminal of said rectifying switching element, an other end of a main terminal of said off-control switch, and said auxiliary winding, and a resistor and a Zener diode are connected between said base and said collector of said drive transistor.

12. The switching power supply device according to claim 1, wherein said drive circuit includes a current detection circuit which detects a current value of the current flowing through the reactor and a gate circuit which turns on and off said rectifying switching element based on the detection result of the current detection circuit when said main switching element is off.

13. The switching power supply device according to claim 1, wherein said current detection circuit includes a current detection resistor having one end connected to said reactor and an other end connected to said secondary winding, and a comparator which compares a voltage generated by said current detection resistor with a predetermined voltage, and said drive circuit turns on and off said rectifying switching element based on an output signal of said comparator when said main switching element is off.

14. A switching method comprising the steps of:

intermittently supplying a current to a primary winding of a transformer; and turning on a rectifying switching element to supply an output of a secondary winding of said transformer to a smoothing circuit via a rectifying switching element by in a period in which no current flows through said first winding and when a current value of a current flowing through a reactor connected, with a current detection circuit, between both end of said secondary winding, connected to said secondary winding of said transformer in parallel, is greater than or equal to a predetermined value, based on said current flowing through said reactor, and turning off said rectifying switching element when said current value of said current flowing through said reactor is less than said predetermined value.

15. A switching power supply device comprising:

a transformer with a primary and a secondary winding;

a main switching element which switches a current flowing through said primary winding;

a controller which controls an operation of said main switching element;

a smoothing circuit;

a rectifying switching element which connects and disconnects between said secondary winding and said smoothing circuit; and a rectifying-element drive circuit which drives said rectifying switching element, and includes a reactor of which one end is connected to one end of said secondary winding stores energy during an on period of said main switching element, and releases said stored energy during an off period of said main switching element, and a drive circuit which receives said signal indicating said current value, and turns on said rectifying switching element in said off period of said main switching element when said current flowing through said reactor is greater than or equal to a predetermined value, and turns off said rectifying switching element when said current flowing through said reactor is less than said predetermined value, said driving circuit includes a current detection circuit which detects the current value of the current flowing through the reactor, and said current detection circuit includes a current detection resistor with one end connected to said reactor and an other end connected to said secondary winding, and a transistor with a control electrode (base), and a first and a second conduction electrode (emitter, collector) which change conduction states based on a signal supplied to said control electrode, said control electrode (base) being connected to said reactor, said first conduction electrode (emitter) being connected to said secondary winding, and said drive circuit turns off said rectifying switching element, based on a voltage at said second conduction electrode of said transistor, when a voltage drop at said current detection resistor due to said current flowing through said reactor becomes lower than a threshold of said transistor, and wherein said drive circuit includes an off-control switch which has a current path with one end (source) connected to said secondary winding, and an other end (drain) connected to a control terminal of said rectifying switching element, and a control terminal (gate) connected to an auxiliary winding, connected to said secondary winding in series, and said second conduction electrode (collector) of said transistor, turns on, reducing a voltage at said control terminal of said rectifying switching element, when said transistor is turned off.

16. The switching power supply device according to claim 15, wherein said drive circuit includes a hysteresis circuit which includes a resistor and a diode, is connected between said reactor and said other end of said current path of said off-control switch, and permits said current flowing through said reactor to partly flow through said off-control switch during an on period of said off-control switch.

17. The switching power supply device according to claim 15, wherein said drive circuit includes a bias circuit which ensures a current flow to said current detection circuit from said auxiliary winding or said control terminal of said rectifying switching element via a resistor.

18. The switching power supply device according to claim 15, wherein said rectifying-element drive circuit includes a capacitor which is connected between said control terminal of said rectifying switching element and said auxiliary winding, and has a function of reducing a voltage at said control terminal of said rectifying switching element.

19. The switching power supply device according to claim 5, wherein said rectifying-element drive circuit includes a capacitor which is connected between said control terminal of said rectifying switching element and said auxiliary winding, and has a function of reducing a voltage at said control terminal of said rectifying switching element, and a function of driving said rectifying switching element.

20. The switching power supply device according to claim 15, wherein said drive circuit includes a drive transistor whose emitter, base, and collector are respectively connected to said control terminal of said rectifying switching element, an other end of a main terminal of said off-control switch, and said auxiliary winding, and a resistor and a Zener diode are connected between said base and said collector of said drive transistor.

21. The switching power supply device according to claim 15, wherein said transistor is a bipolar transistor whose base, emitter, and collector respectively correspond to said control electrode, said first conduction electrode, and said second conduction electrode.

22. The switching power supply device according to claim 15, wherein said transistor is a MOS transistor whose gate, source, and drain respectively correspond to said control electrode, said first conduction electrode, and said second conduction electrode.

23. The switching power supply device according to claim 15, wherein said drive circuit includes a current detection circuit which detects a current value of the current flowing through the reactor and a gate circuit which turns on and off said rectifying switching element based on the detection result of the current detection circuit when said main switching element is off.

24. The switching power supply device according to claim 15, wherein said current detection circuit includes a current detection resistor having one end connected to said reactor and an other end connected to said secondary winding, and a comparator which compares a voltage generated by said current detection resistor with a predetermined voltage, and said drive circuit turns on and off said rectifying switching element based on an output signal of said comparator when said main switching element is off.

* * * * *

UNITED STATES PATENT AND TRADEMARK OFFICE
CERTIFICATE OF CORRECTION

PATENT NO.         : 7,212,416 B2
APPLICATION NO.    : 11/285694
DATED              : May 1, 2007
INVENTOR(S)        : Yoichi Kyono Page 1 of 1

It is certified that error appears in the above-identified patent and that said Letters Patent is hereby corrected as shown below:

Column 17, line 56, please insert --,-- between the words "resistor" and "as."
Column 18, line 11, please insert --collector-- between the words "electrode" and "of."
Column 20, line 25, please delete "5" and insert --15--.

Signed and Sealed this

Thirtieth Day of October, 2007

JON W. DUDAS
*Director of the United States Patent and Trademark Office*